United States Patent [19]

Rees et al.

[11] 4,118,168

[45] Oct. 3, 1978

[54] GUIDANCE SYSTEM FOR SHALLOW ARTICLES DISCHARGED FROM A MOLD CAVITY

[75] Inventors: Herbert Rees, Willowdale; Robert Dietrich Schad, Schomberg, both of Canada

[73] Assignee: Husky Injection Molding Systems Limited, Bolton, Canada

[21] Appl. No.: 792,997

[22] Filed: May 2, 1977

[51] Int. Cl.² .............................................. B29F 1/14
[52] U.S. Cl. .................... 425/556; 425/436 R; 425/810
[58] Field of Search .......... 425/436 R, 436 RM, 149, 425/556, 457, 444, 810, 217; 164/347

[56] References Cited

U.S. PATENT DOCUMENTS

| | | | |
|---|---|---|---|
| 2,613,395 | 10/1952 | Massler | 425/217 |
| 2,698,460 | 1/1955 | Arno | 425/436 RM |
| 2,992,455 | 7/1961 | Salzman | 425/810 X |
| 3,397,425 | 8/1968 | Phillipson et al. | 425/149 X |
| 3,672,437 | 6/1972 | Bennett | 164/347 |
| 3,852,011 | 12/1974 | Maiocco | 425/444 X |
| 3,910,740 | 10/1975 | Rees | 425/437 X |
| 3,910,748 | 10/1975 | Kopernik | 425/556 X |
| 3,986,805 | 10/1976 | Haines | 425/444 X |

*Primary Examiner*—Francis S. Husar
*Assistant Examiner*—William R. Briggs
*Attorney, Agent, or Firm*—Karl F. Ross

[57] ABSTRACT

A mold with two relatively movable portions, one of them having one or more shallow cavities for the production of substantially flat articles, is provided with lateral guide elements which, upon separation of the two mold portions by a distance exceeding but slightly the depth of these cavities, define with the separated mold portions a vertical channel through which the ejected articles descend with a predetermined orientation onto an underlying conveyor or other receiver therefore. The guide elements may be retractable into the mold portion on which they are supported, or partly receivable in the opposite mold portion when the mold is closed. Some of the guide elements could be extensions of ejectors serving to dislodge a molded article from its cavity.

13 Claims, 11 Drawing Figures

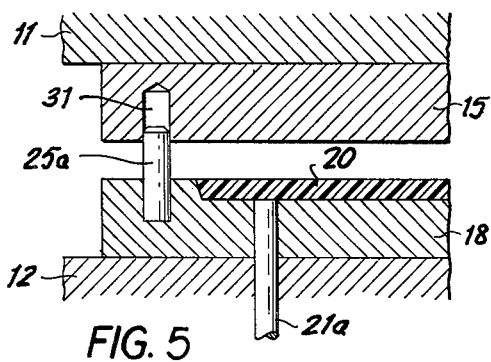
FIG. 5
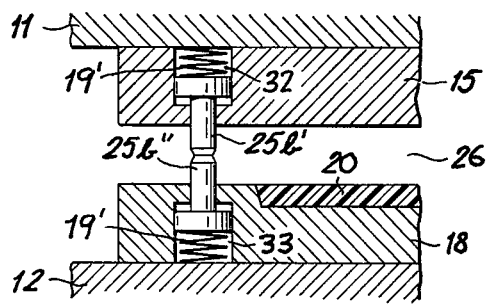
FIG. 6
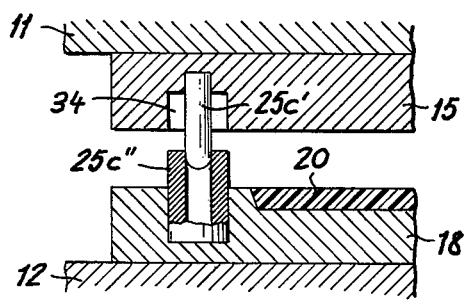
FIG. 7
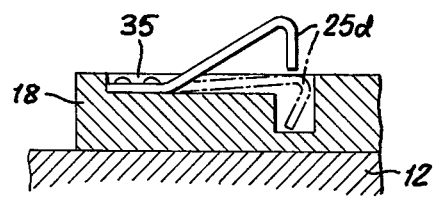
FIG. 8
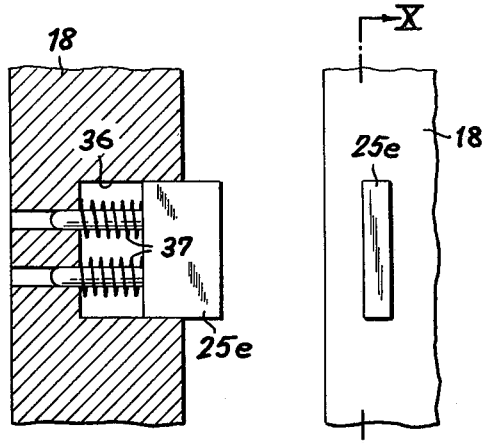
FIG. 10
FIG. 9
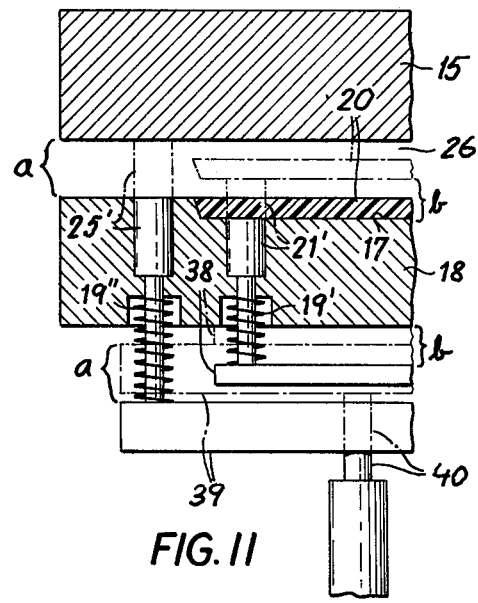
FIG. 11

GUIDANCE SYSTEM FOR SHALLOW ARTICLES DISCHARGED FROM A MOLD CAVITY

FIELD OF THE INVENTION

Our present invention relates to a system for the guidance of shallow injection-molded articles discharged from one or more mold cavities.

BACKGROUND OF THE INVENTION

In commonly owned U.S. Pat. No. 3,910,740 there has been disclosed a system for the guidance of such molded articles ejected into a gap between a pair of separated mold portions, especially substantially flat articles such as shallow cups or flanged lids. The articles, formed in shallow cavities of one mold portion around cores carried on the opposite mold portion, are extracted from their cavities by adhering to the cores when the mold is opened; they are then removed from the cores by a stripper plate and are guided in their descent by lateral rails which flank the mold cores and are transversely movable so as to be more widely spaced apart in the mold-closed position in order not to interfere with the molding process. The first-mentioned mold portion, containing the cavities, is recessed to accommodate the spaced-apart rails when the mold is closed.

Though the system described and claimed in the prior patent is useful in a number of instances, its relative complexity limits its utilization. Moreover, some molded articles do not lend themselves to extraction from a mold cavity on a receding core and thus must be dislodged by conventional ejection pins or the like.

OBJECT OF THE INVENTION

The object of our present invention, therefore, is to provide a simplified and more universally applicable system for the guidance of molded articles discharged from one or more cavities in which they were formed.

SUMMARY OF THE INVENTION

We realize this object, in accordance with our present invention, by the provision of guide means projecting in a mold-open position from at least one of two coacting mold portions toward the other on opposite sides of a cavity and at least in part below the level thereof, the two mold portions being limitedly separable by the drive means to a distance which is greater than the depth of the shallow mold cavity or cavities but less than the other cavity dimensions whereby a substantially vertical channel, maintaining the descending articles in substantially their original orientation, is formed by the separated mold portions and by the guide means.

In such a system the mold cavity or cavities need not be confined to a single mold portion but could also be jointly formed by the two coacting mold portions. There is also no need for providing cores on which the molded articles are retained when the mold is opened. Even relatively bulky articles could be guided in this manner, as long as their thickness is significantly less than their height and width.

The guide means may be constituted by a variety of elements, e.g. pins or blades, which may be received in recesses of the confronting mold portion and/or retracted into their own mold portion in the closure position. No transverse motion of these elements is needed for that purpose; in fact, the guide elements or some of them may be constituted by cavity-bracketing extensions of one or more ejection members moving forward with these members when the mold is opened.

BRIEF DESCRIPTION OF THE DRAWING

The above and other features of our invention will now be described in detail with reference to the accompanying drawing in which:

FIG. 5 is a fragmentary sectional view of a pair of coacting mold portions provided with modified guide means;

FIGS. 6 and 7 are views similar to FIG. 5, illustrating other modifications;

FIG. 8 is a fragmentary sectional view of a mold portion with yet another type of guide means;

FIG. 9 is a partial face view of a mold portion illustrating a further form of guide means;

FIG. 10 is a cross-sectional view taken on the line X—X of FIG. 9; and

FIG. 11 is a view similar to FIGS. 5–7, illustrating actuating means for the correlated displacement of ejection and guide elements.

SPECIFIC DESCRIPTION

Figure 1:
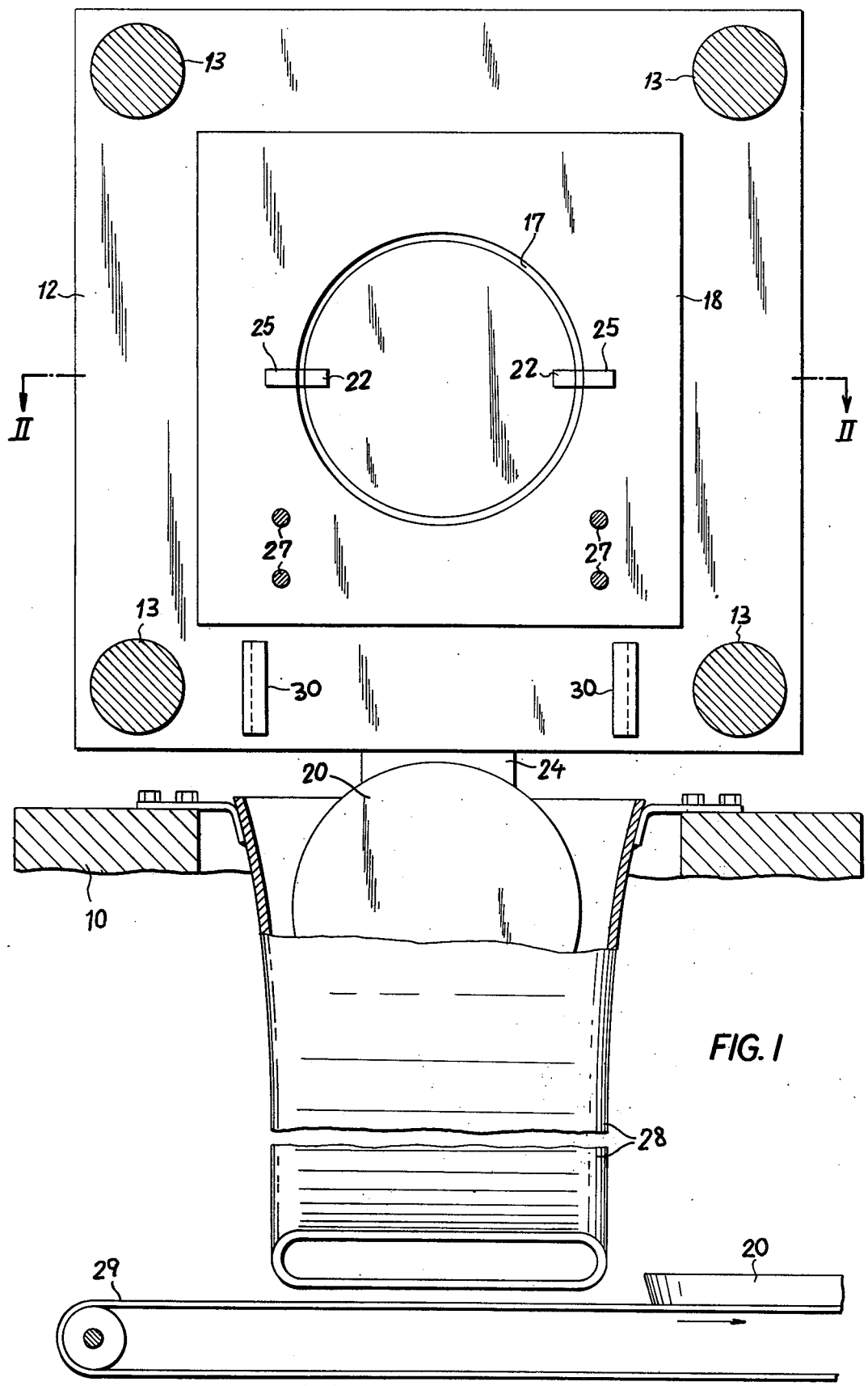
FIG. 1 shows part of an injection-molding machine in vertical cross-section, giving a face view of a mold portion provided with guide means according to our invention.
Figure 2:
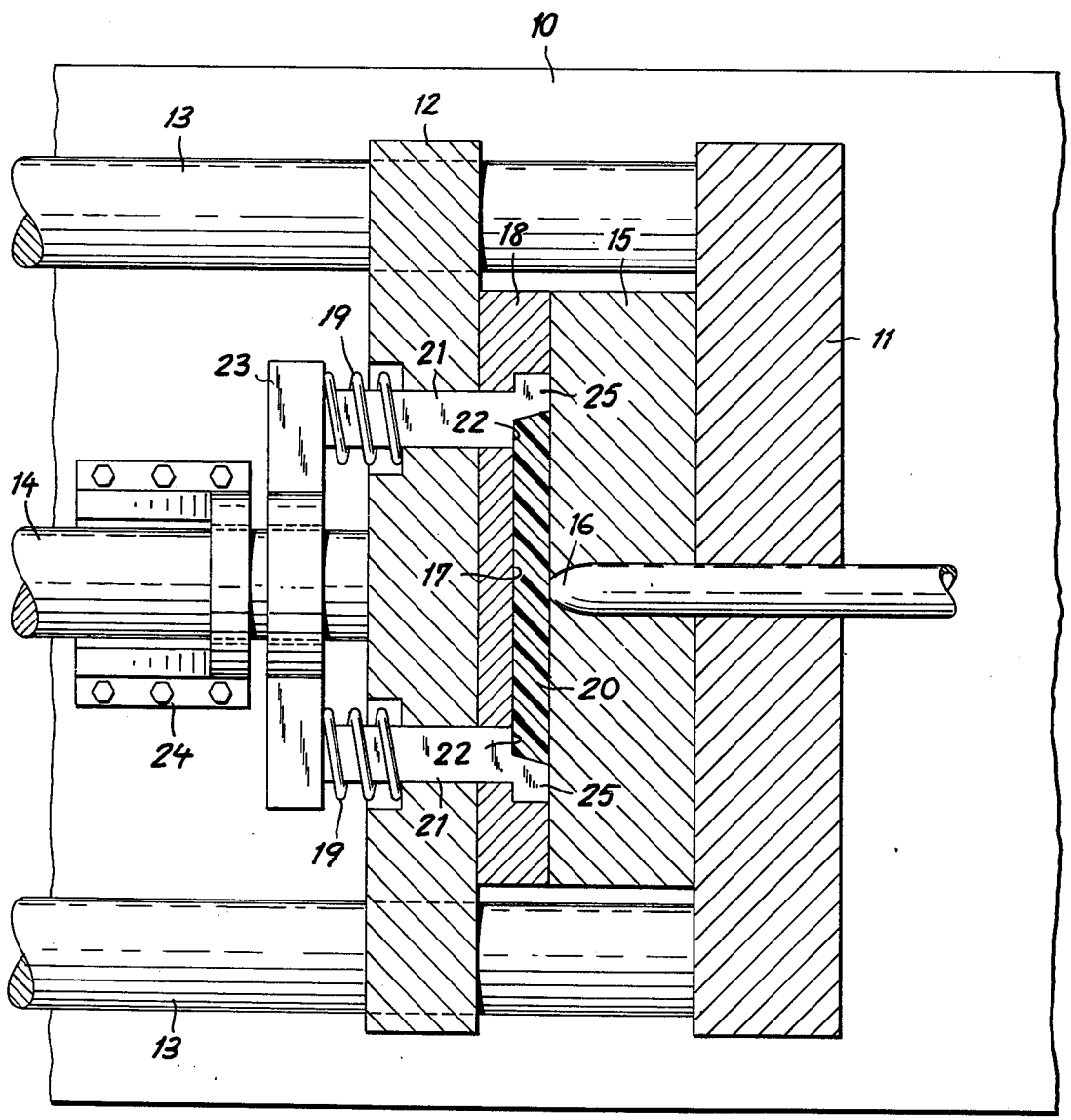
FIG. 2 is a cross-sectional view taken on the line II—II of FIG. 1 and showing a mold in closed position.

As shown in FIGS. 1–4, a conventional injection-molding machine has a bed 10 supporting a fixed platen 11 and a movable platen 12, the latter being slidable along the usual tie bars 13 under the control of a ram 14 whose driving mechanism has not been illustrated. Platen 11 carries a mold portion 15 provided with an injection gate 16 confronting a mold cavity 17 in a coacting mold portion 18. It will be understood that several such cavities, aligned in at least one vertical column as in prior U.S. Pat. No. 3,910,740, may be provided. Cavity 17 could have one or more extensions, not shown, within mold portion 15.

Figure 3:
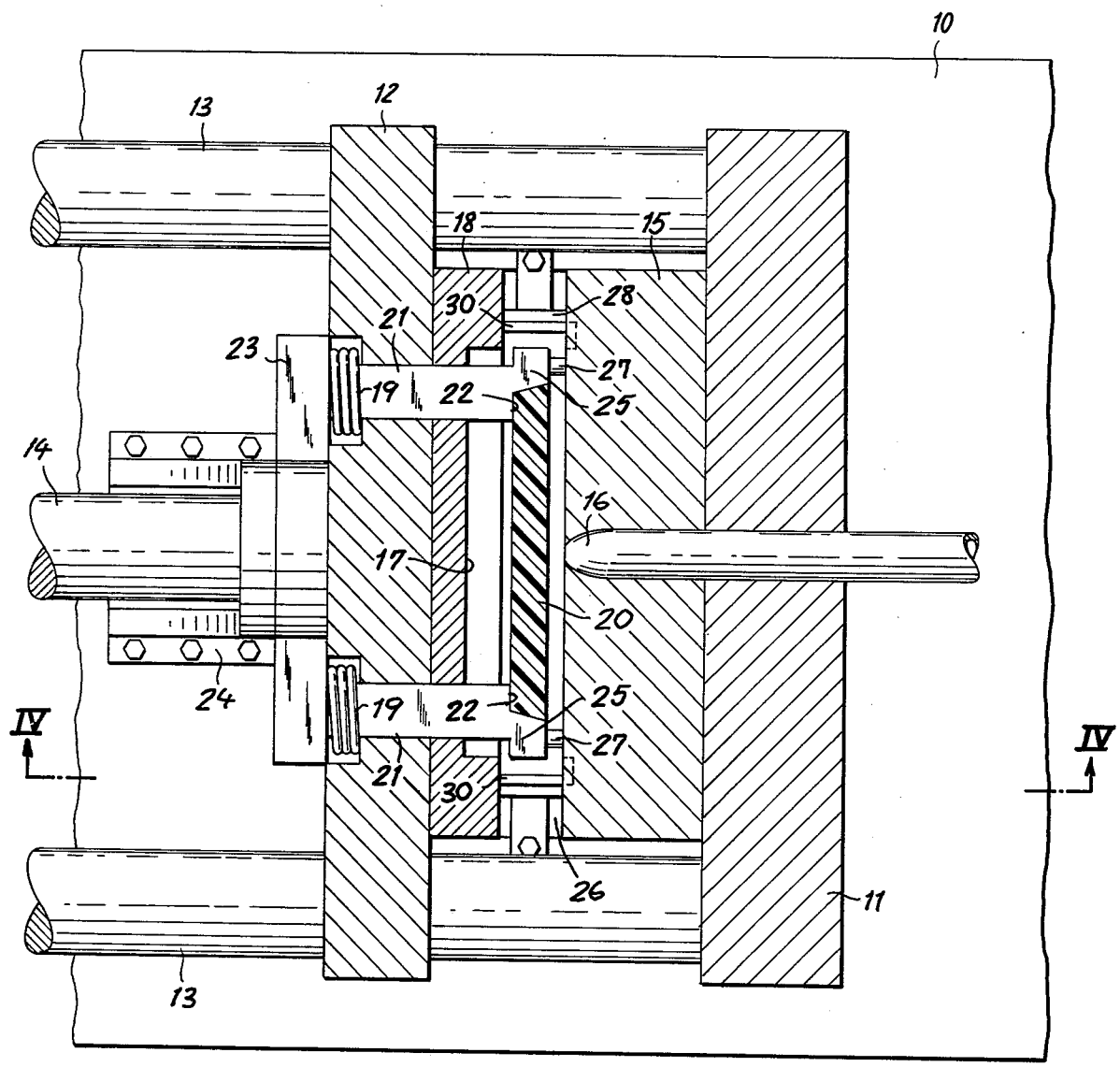
FIG. 3 is a view similar to FIG. 2, showing the mold in its open position.
Figure 4:
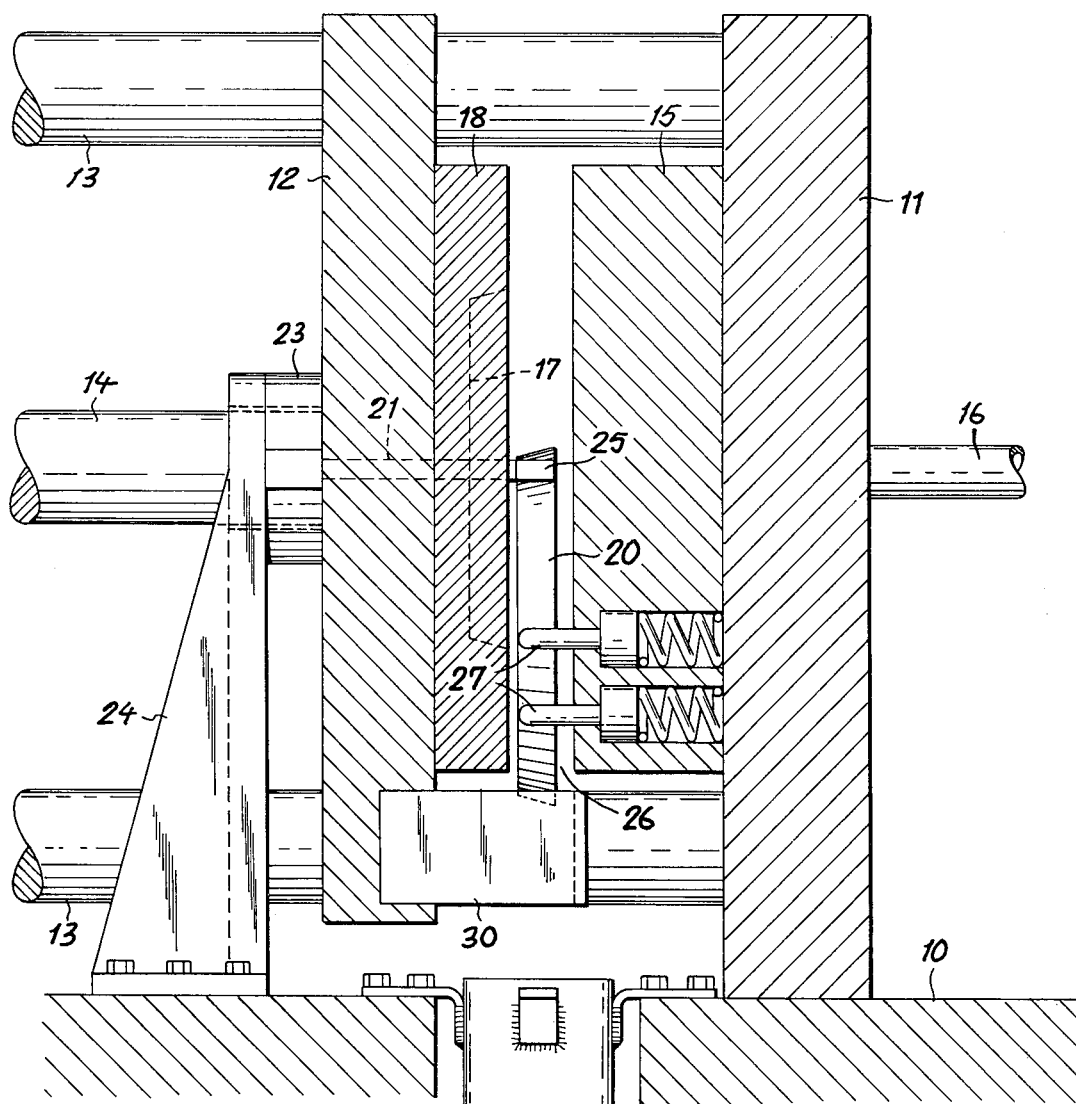
FIG. 4 is a sectional elevation as seen on the line IV—IV of FIG. 3.
Figure 4:
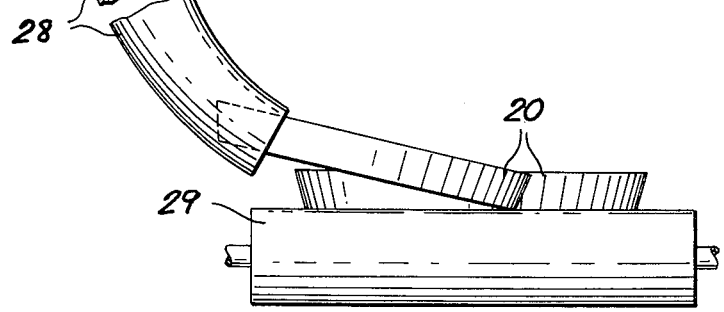

In order to dislodge a molded article 20 from cavity 17, a pair of ejector pins 21 traverse the platen 12 and the mold portion 18. Springs 19 bias the pins 21, provided with shoulders 22, into the retracted position of FIG. 2 in which a bridge 23 linking these pins is rearwardly spaced from platen 12. When the mold is opened by a leftward motion of this platen as seen in FIGS. 3 and 4, bridge 23 comes to rest against a fixed stop 24 rising from the machine bed 10; shoulders 22 then dislodge the molded articles 20 from its cavity while extensions 25 of pins 21 act as a pair of lateral guiding heads controlling the descent of the articles within a gap 26 now separating the confronting vertical surfaces of the two mold portions 15 and 18. From FIG. 1 it will be noted that these extensions or guiding heads 25 form part of the boundary of cavity 17 when the pins 21 are retracted into the position of FIG. 2.

Additional guide means are provided below heads 25 in the form of two sets of pins 27 lodged in mold portion 15 and projecting toward mold portion 18 when the mold is open, as shown in FIGS. 3 and 4. Guide elements 25 and 27 thus define within gap 26 a vertical channel directing the descending articles 20 into an aligned entrance end of an underlying chute 28 whose downwardly slanting exit end deposits them on a transport surface of a conveyor 29 for removal to a further destination. The guide elements 25 and 27 on the mold proper are supplemented by brackets 30 fixedly secured to the lower part of platen 12, these brackets coming to lie beneath mold portion 15 when the mold is closed.

With the extent of the gap 26 limited to substantially less than the diameter of cavity 17 (or of the height and width of that cavity if the latter were rectangular or elliptical instead of circular), the molded article 20 has only limited rotary mobility within its guide channel and will therefore substantially maintain its original orientation when entering the chute 28. It is therefore possible to deposit concurrently and successively molded articles face up on the conveyor 29, i.e. with their concave sides on top if these articles were shallow cups formed with the aid of a core on mold portion 15 in the general manner disclosed in U.S. Pat. No. 3,910,740 (yet without adherence to the core). This facilitates the subsequent stacking of such articles, e.g. as taught in commonly owned U.S. Pat. No. 3,938,675. The descent of the articles 20 dislodged from their cavities can be accelerated by an overhead blower, not shown, as described and illustrated in the aforementioned U.S. Pat. No. 3,910,740.

As illustrated in FIG. 5, a guide pin 25a independent of an ejector pin 21a can be fixedly mounted on a mold portion 18 and can be accommodated in a complementary recess 31 of mold portion 15 when the mold is closed.

In FIG. 6 we have shown the two coacting mold portions 15 and 18 provided with respective recesses 32 and 33 in which substantially symmetrical guide pins 25b', 25b" are movably lodged under pressure of springs 19', 19". The springs 19' and 19" are confined in their recesses by the adjoining platens 11 and 12 to which the mold portions are fastened in a manner not further illustrated. When the mold is opened, the two pins project into the intervening gap 26 in contact with each other; thus, the gap is fully spanned even though the stroke of each pin amounts to only about half the gap width. The arrangement of FIG. 6 is therefore particularly suited for mold portions of small thickness.

FIG. 7 shows the mold portions 15 and 18 provided with telescoped pins 25c', 25c" fixedly mounted thereon, mold portion 15 having a recess 34 surrounding the pin 25c' in order to accommodate the pin 25c" when the mold is closed. This arrangement is also especially suitable for relatively thin mold portions.

In FIG. 8 we have shown a mold portion 18 provided with a transverse recess 35 accommodating a leaf spring 25d with a bent extremity which acts as a guide when the spring is free to emerge from the recess in the mold-open position as illustrated in full lines. Upon closure of the mold, the spring is repressed by the coacting mold portion 15 (not visible in FIG. 8) into the recess 35 as indicated in dot-dash lines.

In FIGS. 9 and 10 we have shown a mold portion 18 with a vertical recess 36 into which a guide blade 25e is retractable against the force of a pair of springs 37.

In FIG, 11, finally, mold portion 18 is traversed by a set of ejector pins 21' (only one shown), interconnected by a bridge 38, and by a set of guide pins 25' (also only one shown), interconnected by a bridge 39. The two bridges 38 and 39 are aligned with each other and are biased rearwardly, by springs 19' and 19", into limiting positions indicated in full lines. One or more hydraulic actuators or jacks 40 are controlled by a non-illustrated programmer, in synchronism with the mold drive, to advance the bridge 39 with its guide pins 25' upon the opening of the mold as illustrated in dot-dash lines; the advancing stroke $a$ equals the width of gap 26. In the course of this forward movement, the bridge 39 encounters the bridge 38 and advances it into contact with mold portion 18, i.e. by a distance $b$ sufficient to eject the molded article 20 from its cavity 17 as also indicated by dot-dash lines. Thus, the ejection occurs only after the pins 25' have established the guide channel for the descent of the molded article. Bridges 38 and 39 constitute a lost-motion connection between ejector pins 21' and actuator 40.

Naturally, pins 25' of FIG. 11 could be replaced by other ejection elements such as those shown in FIGS. 5-10 at 25a-25e. Other modifications, e.g. as concerns the actuating mechanism for the guide and ejector elements, will be readily apparent to persons skilled in the art.

We claim:

1. In an injection-molding machine including a mold with a first and a second mold portion having substantially vertical confronting surfaces, one of said surfaces being formed with at least one shallow cavity, reciprocable drive means coupled with said first mold portion for displacing same relatively to said second mold portion between a mold-open position and a mold-closed position, injection means connected to said second mold portion for filling said cavity in said mold-closed position with a flowable mass hardening into a molded article, and ejection means on the mold portion formed with said cavity for discharging the molded article therefrom, the combination therewith of guide means on at least one of said mold portions projecting in said mold-open position toward the other of said mold portions on opposite sides of said cavity and at least in part below the level thereof to define with the confronting surfaces of the separated mold portions a substantially vertical channel for the controlled descent of the ejected article to a receiver therefor, said drive means having a stroke which limits the separation of said confronting surfaces in said mold-open position to a distance greater than the depth of said cavity perpendicular to said surfaces but less than the dimensions of said cavity parallel to said surfaces whereby the descending article is maintained substantially in its original upright orientation within said channel, said guide means including at least one pair of cavity-flanking elements retractable into said one of said mold portions in said mold-closed position.

2. The combination defined in claim 1 wherein said receiver includes a chute underneath said mold portions aligned with said channel.

3. The combination defined in claim 1 wherein said elements are two rows of pins flanking said cavity.

4. The combination defined in claim 1 wherein said elements are at least one pair of blades flanking said cavity.

5. The combination defined in claim 1 wherein said elements are extensions of said ejection means bracketing said cavity between them.

6. The combination defined in claim 1 wherein said elements are provided with spring means biasing same toward said other of said mold portions.

7. The combination defined in claim 1 wherein said elements are mounted on said first mold portion and are retracted into same in said mold-closed position, further comprising stop means disposed rearwardly of said first mold portion for arresting said elements in a position close to said second mold portion during a mold-opening stroke of said drive means.

8. The combination defined in claim 1 wherein said elements and said ejection means are provided with common actuating means for correlated displacement toward said other of said mold portions in said mold-open position.

9. The combination defined in claim 8 wherein said elements are positively coupled with said actuating means, said ejection means being linked with said actuating means via a lost-motion connection for discharging the molded article from said cavity only after beginning displacement of said elements toward said other of said mold portions.

10. In an injection-molding machine including a mold with a first and a second mold portion having substantially vertical confronting surfaces, one of said surfaces being formed with at least one shallow cavity, reciprocable drive means coupled with said first mold portion for displacing same relatively to said second mold portion between a mold-open position and a mold-closed position, injection means connected to said second mold portion for filling said cavity in said mold-closed position with a flowable mass hardening into a molded article, and ejection means on the mold portion formed with said cavity for discharging the molded article therefrom, the combination therewith of:

guide means on at least one of said mold portions projecting in said mold-open position toward the other of said mold portions on opposite sides of said cavity at and below the level thereof to define with the confronting surfaces of the separated mold portions a substantially vertical channel for the controlled descent of the ejected article, said drive means having a stroke which limits the separation of said confronting surfaces in said mold-open position to a distance greater than the depth of said cavity perpendicular to said surfaces but less than the dimensions of said cavity parallel to said surfaces whereby the descending article is maintained substantially in its original upright orientation within said channel, said guide means including at least one pair of cavity-flanking elements retractable into said one of said mold portions in said mold-closed position;

a chute underneath said mold portions having an entrance end aligned with said channel for receiving the descending article therefrom; and conveyor means for removing the article to a further destination in a predetermined position, said chute having a downwardly slanting exit end opening onto a transport surface of said conveyor means.

11. The combination defined in claim 10 wherein said guide means comprises a plurality of elements flanking said cavity and spanning substantially the entire gap between said mold portions in said mold-open position.

12. The combination defined in claim 1 wherein said other of said mold portions is provided with recesses accommodating said elements in said mold-closed position.

13. The combination defined in claim 1 wherein said elements are retractable into said one of said mold portions in said mold-closed position.

* * * * *